Jan. 26, 1954     E. S. MacPHERSON     2,667,231
VEHICLE CHASSIS AND MOTOR SUPPORT THEREON
Filed May 3, 1952                          3 Sheets-Sheet 1

E. S. MacPHERSON
INVENTOR.

BY E. C. McRae
J. R. Faulkner
A. H. Oster

ATTORNEYS

Jan. 26, 1954     E. S. MacPHERSON     2,667,231
VEHICLE CHASSIS AND MOTOR SUPPORT THEREON
Filed May 3, 1952     3 Sheets-Sheet 3
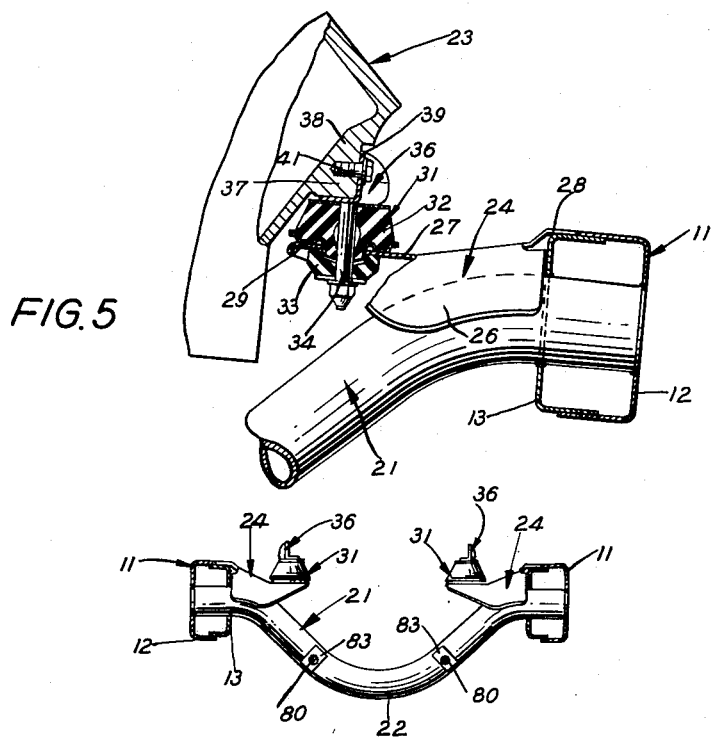
FIG. 5
FIG. 6
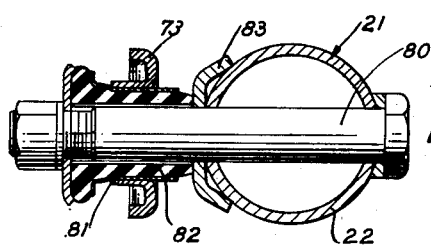
FIG. 7
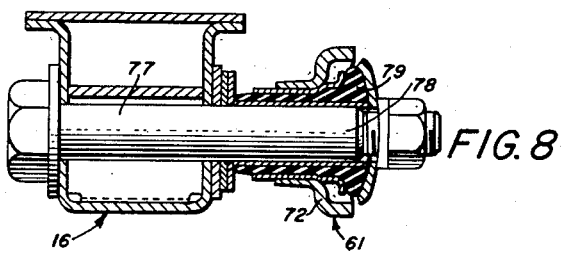
FIG. 8
E. S. MacPHERSON
INVENTOR.
BY E. C. McRae
J. R. Faulkner
J. H. Oster
ATTORNEYS Patented Jan. 26, 1954

2,667,231

UNITED STATES PATENT OFFICE 2,667,231

VEHICLE CHASSIS AND MOTOR SUPPORT THEREON

Earle S. MacPherson, Huntington Woods, Mich., assignor to Ford Motor Company, Dearborn, Mich., a corporation of Delaware Application May 3, 1952, Serial No. 285,872

2 Claims. (Cl. 180—64)

1

This invention relates generally to motor vehicle chassis construction and particularly to the construction of the forward portion of a motor vehicle chassis.

An object of the present invention is to provide a motor vehicle chassis construction incorporating an independent suspension system for the front vehicle wheels while at the same time eliminating the large front cross member commonly used on the majority of contemporary vehicles. This large front cross member is usually located in the zone of the front wheels and materially interferes with the desired placement and serviceability of the vehicle engine and various components. The construction of the present invention eliminates this large front cross member and instead uses a smaller intermediate cross member located rearwardly of the transverse axis of the front wheel spindles, together with a cross member at the extreme forward end of the frame. This arrangement provides a large rectangular open space between the side frame members and the two small cross frame members, and contributes to many design advantages. The engine may be placed in a low position straddling the intermediate cross frame member, the latter being bowed downwardly to provide clearance, and results in a flatter engine angle and also minimizes driveline vibrations. In addition, the hood may be lowered to improve forward visibility, without sacrificing adequate ground clearance. Usable passenger space is also increased since the front wheels and the engine can be brought back closer to the dash, resulting in a more compact design.

Another object of the present invention is to provide a motor vehicle chassis in which the side frame members are interconnected at the forward portion of the vehicle by a pair of relatively small downwardly bowed cross frame members widely spaced from each other longitudinally of the vehicle to provide a relatively large rectangular open space between the side and cross frame members, and to utilize an independent suspension system which will not materially encroach upon this rectangular space. A square type of independent suspension is used in which the upper and lower suspension members for each front wheel are connected to the frame for pivotal movement about parallel, horizontal longitudinally extending axes. The lower suspension members comprise rearward arms pivotally connected to the intermediate cross frame member and extending transversely of the vehicle closely adjacent said cross frame member, and

2 forward arms joined at their outer ends to the rearward arms and diverging sharply therefrom in a forward direction for pivotal connection to the front cross frame member in such manner that the front arms of the lower suspension members intercept the rectangular open space in the frame only slightly at the forward corners thereof so as not to materially obstruct this space. With this arrangement the engine can be mounted upon engine mounts supported upon the intermediate cross frame member substantially at the center of gravity of the engine, and the major portion of the engine and its components and accessories can be located forwardly of the intermediate cross member in the said open space so as to provide for servicing of a large portion of the engine from beneath the chassis. In addition, the engine mounting is ideal for maximum structural strength and good vibration insulation. The use of ball joints at the outer ends of the suspension members eliminates any binding which might result from mounting the lower suspension member upon separate pivots.

A still further object of the invention is to provide a motor vehicle chassis construction of the type mentioned in which the engine oil pan can be removed from the lower portion of the engine without removing the steering linkage and without lifting the engine from its mounts as is necessary with many vehicles today. The steering linkage is located rearwardly of the intermediate cross frame member, and the engine oil pan has a deep forward portion located between the front and intermediate cross frame members and extending beneath the level of the intermediate frame member. The rearward portion of the oil pan is relatively shallow and is inclined upwardly in a rearward direction over the intermediate frame member, the arrangement being such as to enable the deep front portion of the oil pan to be lowered slightly and the pan then tilted and slid forwardly and downwardly without disturbing the steering linkage or the engine.

Other objects and advantages of the present invention will be made more apparent as this description proceeds, particularly when considered in connection with the accompanying drawings, wherein:

Figure 5 is an enlarged transverse cross-sectional view taken on the plane indicated by the line 5—5 of Figure 1.

Figure 6 is a cross-sectional view taken on the plane indicated by the line 6—6 of Figure 4.

Figure 7 is an enlarged cross-sectional view taken on the plane indicated by the line 7—7 of Figure 1.

Figure 8 is an enlarged cross sectional view taken on the plane indicated by the line 8—8 of Figure 1.

Figure 2:
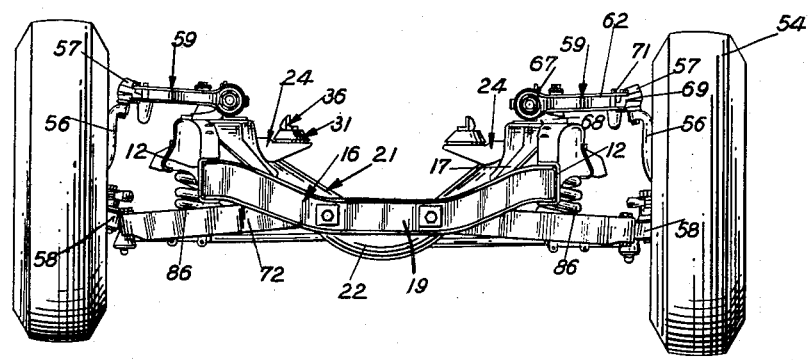
Figure 2 is a front elevational view of the construction shown in Figure 1.

Referring now to the drawings, the reference character 11 indicates the side frame members of the motor vehicle chassis. The side frame members are of box section, each being formed of an inwardly opening channel 12 closed by an outwardly opening channel 13 to form a closed box section. The extreme forward ends of the channels 12 of the side frame members are joined by a transversely extending front cross frame member 16. This cross frame member is of box section, and is also supported by the forward ends 17 of the channels 13, which are separated at their forward ends from the channels 12 to form reinforcing braces. As best seen in Figure 2 the front cross frame member 16 has a central downwardly offset portion 19 located beneath the level of the side frame members 11.

Spaced a considerable distance rearwardly of the front cross frame member 16 is an intermediate cross frame member 21. The intermediate cross frame member 21 is of tubular cross-section and has its outer ends extending through aligned openings in the channels 12 and 13 of the side frame members 11, being welded thereto. Intermediate the side rails, the tubular intermediate cross frame member 21 is bowed downwardly so that the central portion 22 thereof is located beneath the side frame members and provides sufficient clearance to permit the vehicle engine to be mounted in a relatively low position.

The engine 23 of the vehicle is mounted above the tubular intermediate cross frame member 21 with its center of gravity substantially in vertical alignment with this member. To provide a strong support for the engine substantially at its center of gravity, resilient mounting means are provided near the opposite ends of the tubular cross frame member. Each engine mount, as best seen in Figure 5, comprises an inverted U-shaped mounting bracket 24 having side flanges 26 welded to opposite sides of the tubular cross frame member 21 adjacent the connection of the latter to the side frame members 11, and an upper flange 27 having an outwardly projecting portion 28 overlapping the adjacent part of the inner channel 13 of the side frame member 11 and suitably secured thereto as by welding. The upper flange 27 of the mounting bracket extends inwardly and generally horizontally and its inner end 29 is spaced above the downwardly bowed portion of the tubular cross frame member 21. The outer portion 29 of the upper flange 27 of the mounting bracket is apertured to receive a conventional rubber puck type engine mount 31 having upper and lower portions 32 and 33 straddling the upper flange of the mounting bracket and secured to each other by means of a connecting bolt 34. An angle bracket 36 also forms part of the engine mount 31, being secured thereto by means of the bolt 34. A pair of longitudinally spaced bosses 37 are provided upon each side of the block 38 of the engine and engage the vertical flange 39 of the adjacent engine mount bracket 36, the flange 39 being bolted to the engine block by means of studs 41. It will be apparent that the engine mounts thus formed are advantageously located near the center of gravity of the engine and are directly supported upon the relatively strong tubular cross frame member 21 so as to minimize engine vibration and form a strong support therefor. In addition, the arrangement forms a relatively low mounting for the engine.

Figure 3:
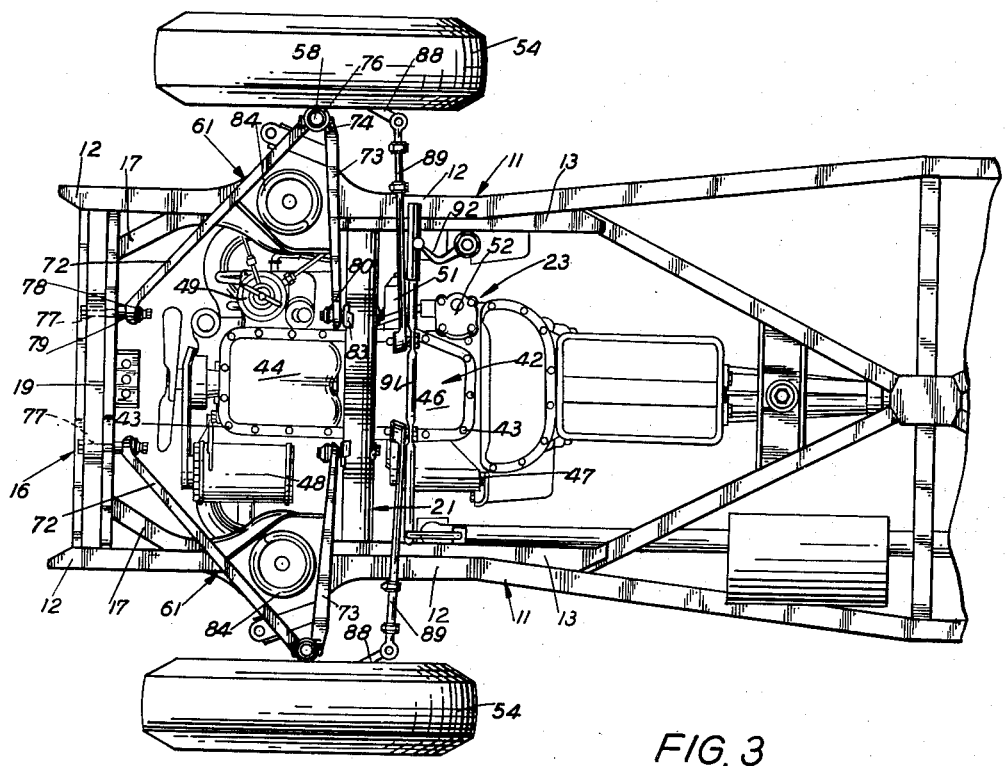
Figure 3 is a bottom plan view of the chassis shown in Figure 1, with the engine installed.
Figure 4:
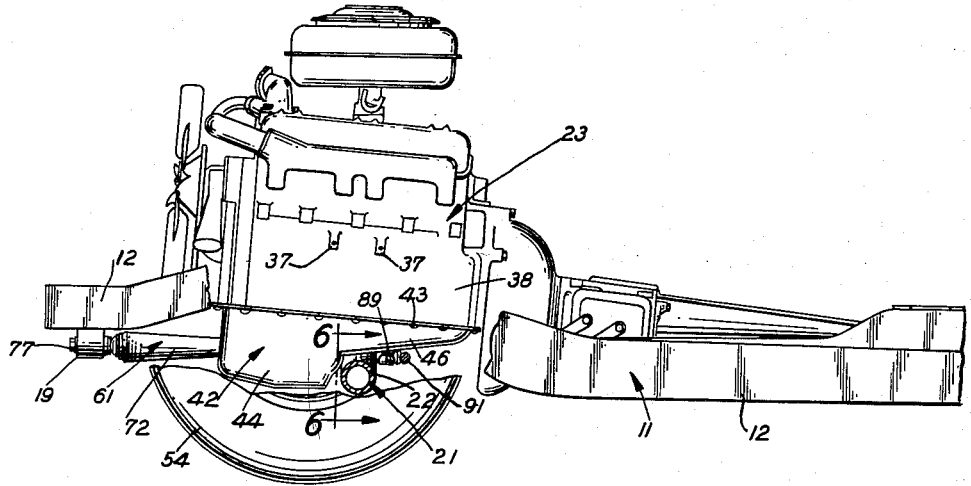
Figure 4 is a side elevational view of the chassis.

With reference now particularly to Figures 3 and 4, it will be noted that an engine pan 42 is removably secured to the bottom of the engine block 38 by means of bolts 43. The engine pan 42 has a relatively deep forward sump portion 44 located forwardly of the tubular cross frame member 21 in the space between the front and intermediate cross frame members 16 and 21. The sump portion 44 extends downwardly beneath the level of the intermediate cross frame member and consequently contributes to a low engine height. The rearward portion 46 of the engine oil pan 42 is relatively shallow compared to the forward portion 44 and its lower surface is inclined slightly upwardly in a rearward direction and passes over the central bowed portion 22 of the tubular cross frame member 21. The arrangement is such that the entire engine pan can be conveniently removed without the necessity of raising the engine from its mounts and without interfering with any of the other engine or vehicle chassis components. This is accomplished by first loosening the bolts 43 securing the pan to the engine block, and then with a combined downward and forward movement tilting and sliding the engine pan forwardly until the rearward portion thereof is ahead of the intermediate cross frame member 21, after which it can be dropped. Re-assembly of the pan to the engine is accomplished in the reverse manner. The relatively large open rectangular space between the side frame members 11 and the front and intermediate cross frame members 16 and 21 enables the engine pan to be removed in this fashion.

The large open space between the frame members also permits a great deal of the other servicing of engine components to be accomplished from beneath the vehicle, thus freeing the engine compartment and permitting a relatively low hood height. The engine starter 47 and generator 48, as seen in Figure 3, are accessible from beneath the chassis and are easily removed through the clearance spaces between the frame members. In addition, the fuel pump 49, oil filter 51 and oil pump 52 are mounted upon the lower portion of the engine and are accessible for servicing from beneath the chassis. In addition to facilitating the service problem, the foregoing location of these engine components places them in more advantageous locations in so far as cooling is concerned. For example, the location of the fuel pump lowers its temperature 20° and reduces the suction head.

Front steerable wheels 54 are provided at opposite sides of the frame and are independently suspended. Since the suspensions for these wheels are identical, only that for the left front wheel will be described in detail. The wheel is rotatably mounted upon an integral forged wheel spindle support 56. Conventional upper and lower ball joints 57 and 58 are mounted at the upper and lower ends of the wheel spindle support 56 and provide universal connections between the wheel spindle support and the upper and lower suspension members 59 and 61 respectively.

Figure 1:
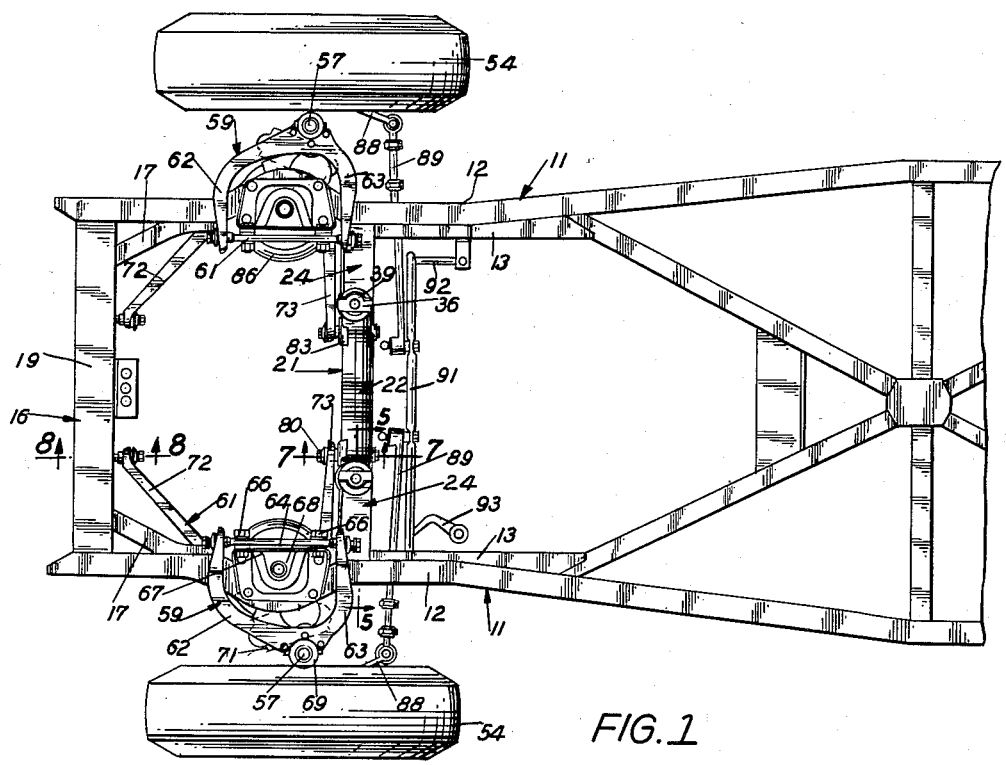
Figure 1 is a plan view of the forward portion of a motor vehicle chassis constructed in accordance with the present invention, with the engine removed.

As best seen in Figure 1, the upper suspension member 59 comprises a sheet metal generally U-shaped member having bifurcated inwardly extending front and rear arms 62 and 63 respectively. The inner extremities of these arms are pivotally mounted upon the ends of a pivot bar 64 which in turn is secured by bolts 66 to the vertical flange 67 of a bracket 68 mounted upon the side frame member 11 and suitably secured to the channels 12 and 13 thereof. The axis of the pivot bar 64 is horizontal and extends longitudinally of the vehicle. At the outer end of the upper suspension member 59 the latter supports the socket 69 of the upper ball joint 57. The socket 69 is mounted between the upper and lower horizontally extending flanges of the upper suspension member 59 and is secured thereto by bolts 71. It will be noted that the socket 69 of the upper ball joint is not located at the longitudinal center of the upper suspension member 59 but is considerably closer to the rear arm 63 of the suspension member than to the front arm 62 thereof.

The lower suspension member 61 is best seen in Figure 3. This suspension member is formed of a pair of arms 72 and 73, each comprising an inwardly facing U-shaped sheet metal channel. At their outer ends the arms 72 and 73 are closely adjacent each other and are secured by bolts 74 to the socket 76 of the lower ball joint 58. At their inner ends the arms 72 and 73 of the lower suspension member are pivotally supported upon the front cross frame member 16 and the intermediate cross frame member 21 respectively. The connection between the front arm 72 and front cross frame member 16 comprises a pivot shaft 77 extending completely through the front cross frame member and having a projecting portion 78 extending rearwardly of the frame member and supporting a rubber bushing 79 forming a pivotal support for the inner end of the front arm 72 of the lower suspension member.

As best seen in Figure 7, a similar pivot shaft 80 extends through the tubular cross frame member 21 and has a forwardly projecting portion 81 upon which the inner end of the rear arm 73 of the lower suspension member is pivotally supported by means of a rubber bushing 82. A reinforcing block 83 is welded to the frame member 21 adjacent the bolt 80. The pivot shaft 77 for the front arm of the lower suspension member is mounted in the downwardly offset portion 19 of the front cross frame member, while the pivot shaft 80 for the rear arm is mounted in the downwardly bowed portion 22 of the tubular intermediate cross frame member 21. The pivot shafts 77 and 80 are in longitudinal alignment with each other to form an axis for the lower suspension member which is horizontal and parallel to the axis of the pivot bar 64 for the upper suspension member 59.

The rear arm 73 of each lower suspension member extends generally transversely and is positioned closely adjacent the forward side of the tubular cross frame member 21. Consequently it does not substantially interfere with the free space provided between the side frame members 11 and the front and intermediate cross frame members 16 and 21 respectively. The front arm 72 of the lower suspension member is arranged in sharply diverging relation to the rear arm 73 and crosses the aforesaid open space only adjacent the front corners thereof, and consequently it does not materially interfere with the available space for the engine and its components and the servicing thereof. A spring pan 84 interconnects the front and rear arms 72 and 73 of the lower suspension member 61 and forms a support for the lower end of the coil spring 86. The upper end of the spring is seated within the bracket 68 mounted upon the side frame member. The coil spring operates conventionally, and houses a tubular shock absorber extending centrally therethrough.

From the foregoing it will be seen that the inner axes of the upper and lower suspension members for the front steerable wheels are arranged in a square fashion, that is with each parallel to each other and extending horizontally and longitudinally. This arrangement not only provides an efficient suspension system but also compactly arranges the parts thereof for minimum interference with other chassis and engine components. In the present instance the pivotal connections at the inner ends of the upper and lower suspension members comprise rubber bushings which contribute to quietness and also reduce the number of lubrication points. Although the lower suspension members have their front and rear arms mounted upon separate pivots, no binding in the system results since ball joints are utilized between the outer ends of the suspension members and the wheel spindle supports. The suspension system lends itself to pre-assembly as a unit after which the assemblies may be readily mounted upon the frame with the aid of a special fixture, automatically setting the camber, caster and all other adjustments to design requirements.

The foregoing chassis design readily lends itself to a convenient location of the steering linkage rearwardly of the tubular intermediate cross frame member 21. Steering arms 88 are secured to the wheel spindle supports 56, and the steering arms are in turn connected by ball joints to conventional type tie rods 89, the latter being connected to a drag link 91 having one end connected to an idler arm 92 on the frame and the other arm connected to the steering pitman arm 93. The tie rods 89 and the drag link 91 extend beneath the rearward portion 46 of the engine oil pan 42 just rearwardly of the tubular intermediate cross frame member 21, and in this position do not interfere with the removal of the oil pan or with other chassis components.

It will be seen from the foregoing that a chassis construction is provided which is relatively simple and inexpensive to manufacture and yet which provides an efficient suspension system and excellent structural strength. In addition, the arrangement permits the engine to be mounted in such manner as to provide for serviceability and at the same time promotes a low compact vehicle design with a low hood in keeping with present styling trends. The over-all design also provides for flexibility for future design changes in that engine and engine component changes as well as changes in wheel and steering geometries can be easily worked out without major changes in the basic over-all structure. This enables engineering advances to be incorporated without requiring prohibitive tooling costs.

It will be understood that the invention is not to be limited to the exact construction shown and described, but that various changes and modifications may be made without departing from the spirit and scope of the invention, as defined in the appended claims.

What is claimed is:

1. A motor vehicle chassis comprising a pair of laterally spaced longitudinally extending side frame members, a front transversely extending cross frame member interconnecting said side frame members at the extreme forward ends thereof, an intermediate transversely extending cross frame member interconnecting said side frame members and spaced a substantial distance rearwardly of said front cross frame member, said intermediate cross frame member being tubular in cross-section and being bowed downwardly between said side frame members so that the central portion of the intermediate cross frame member is substantially below the level of said side frame members to provide clearance for mounting an engine therebetween, an engine having its center of gravity located substantially in vertical alignment with said intermediate cross frame member, a pair of resilient engine mounts supported upon said intermediate cross frame member at opposite sides of said engine, supporting means at opposite sides of said engine connected to said engine mounts, an oil pan mounted upon the bottom of said engine and straddling the downwardly bowed portion of said intermediate cross frame member, said oil pan having a deep forward portion located between said front and intermediate cross frame members and extending beneath the level of said intermediate cross frame member, said oil pan also having a shallower intermediate portion located above the central bowed portion of said intermediate cross frame member and a rearward portion extending rearwardly therefrom, said rearward portion being located entirely above the level of the intermediate cross frame member and being inclined progressively upwardly in a rearwardly direction from the intermediate cross frame member, sufficient room being provided between the forward portion of said oil pan and said front cross frame member to permit said oil pan to be detached and removed from said engine without disconnecting said engine from its engine mounts by dropping the deep forward portion of said oil pan and thereafter sliding said oil pan forwardly and downwardly.

2. The structure defined by claim 1 which is further characterized in that engine mount brackets are provided for said engine mounts, each of said brackets being substantially inverted U-shaped in cross section and having side generally vertically flanges straddling said tubular cross frame member adjacent its connection to said side frame members and an upper flange extending beyond the extremities of said side flanges and overlapping said side frame member, the upper flange of said engine mount bracket being substantially horizontal and extending inwardly above the downwardly bowed portion of said tubular cross frame member, a boss formed upon the engine block vertically above the inner end of each of said engine mount brackets, and resilient puck engine mounts secured between the bosses on said engine block and the inner ends of the upper flanges of said engine mount brackets.

EARLE S. MacPHERSON.

References Cited in the file of this patent

UNITED STATES PATENTS

| Number | Name | Date |
|---|---|---|
| 1,971,209 | Carpenter et al. | Aug. 21, 1934 |
| 2,228,132 | Werner | Jan. 7, 1941 |
| 2,314,076 | Casner | Mar. 16, 1943 |
| 2,488,979 | Kogstrom | Nov. 22, 1949 |
| 2,556,767 | McCann | June 12, 1951 |
| 2,624,592 | MacPherson | Jan. 6, 1953 |

FOREIGN PATENTS

| Number | Country | Date |
|---|---|---|
| 635,864 | Great Britain | Apr. 19, 1950 |